April 24, 1934. V. H. HANCOCK Re. 19,142

LENS

Original Filed Nov. 15, 1929

Virgil H. Hancock
INVENTOR

BY Victor J. Evans
ATTORNEY

Reissued Apr. 24, 1934

Re. 19,142

UNITED STATES PATENT OFFICE 19,142

LENS

Virgil H. Hancock, New Orleans, La., assignor to The Univis Corporation, Dayton, Ohio, a corporation of Delaware Original No. 1,876,497, dated September 6, 1932, Serial No. 407,487, November 15, 1929. Application for reissue February 17, 1933, Serial No. 657,248

9 Claims. (Cl. 88—54)

This invention relates to improvements in lenses and has particular relation to an improved construction of lens of the trifocal type.

One of the primary objects of the present invention is the provision of a lens of the fused type, which will embody a plurality of foci to satisfactorily correct the vision of the wearer, and provide for clear distant vision, intermediate distant vision and near vision.

A further object of the invention is the provision of a trifocal lens which may be readily or simply formed with a minimum amount of grinding and fusing labor.

Another object of the invention is to provide a lens which will embody an upper distant vision portion, an intermediate vision portion and a lower reading or near vision portion, so that the wearer may obtain clear vision at a distance of approximately seven or more feet through the upper distant vision portion, clear vision at a distance of approximately two or three feet through the intermediate vision portion, and clear reading or near vision at approximately fourteen inches.

Another object of the invention is to improve trifocal or multifocal lenses through the employment of glass of different indices of refraction.

A further object of this invention is the provision of an improved lens of trifocal character which will tend to minimize prismatic displacement across the boundary lines between the various portions of the lens, which displacement ordinarily causes an apparent elevation of objects to the great annoyance and actual discomfort of the wearer of the trifocal lenses. In my improved trifocal, I provide a two-part minor lens or insert secured within a recess or countersink in a major lens, these two parts being composed of glasses whose indices of refraction differ from each other and from that of the major lens; these two parts being joined together edge-to-edge without any overlap relative to one another, and located above one another in such manner that there is provided the widest lateral field of view within each part consistent with the total size of the minor lens as a whole. The minimization of prismatic effect referred to is thus accomplished by being able to provide these laterally large and efficiently-located minor fields, yet maintain a small overall size of minor lens as a whole. The said minor lens in my improved trifocal is contained within a recess or countersink having a single radius of curvature over the entire extent common to both parts.

With the above and other objects in view, the invention further includes the following novel features and details of construction to be hereinafter more fully described, illustrated in the accompanying drawing and pointed out in the appended claims.

In the drawing:—

Figure 1:
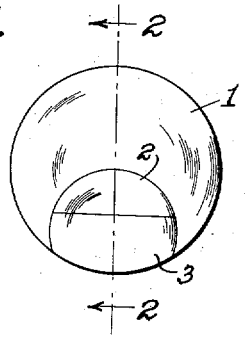
Figure 1 is a view of a completed trifocal lens with the various indices of glass indicated thereon.
Figure 3:
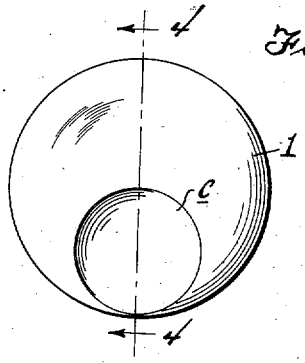
Figure 3 is a view of the major lens.
Figure 2:
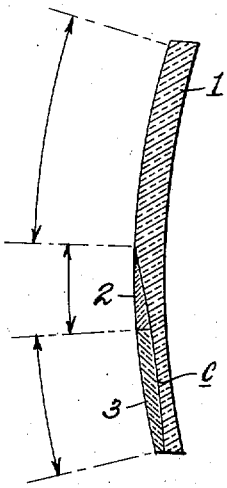
Figure 2 is an enlarged sectional view on the line 2—2 of Figure 1.

Referring to the drawing in detail wherein like characters of reference denote corresponding parts, the reference character 1 indicates what may be termed the major lens, the diameter of which is greater than the diameter of the finished lens, as may be readily seen by comparison of Figures 1 and 3 of the drawing. This major lens is indexed 1.523 and is formed with countersink c. This kind of countersink is ordinarily intended for the reception of a single homogeneous lens. In the present invention, however, the countersink c is for the purpose of accommodating a compound minor lens, the upper portion 2 of which is indexed 1.62, while the lower portion 3 is indexed 1.69.

Different indices of refraction are thus employed, the upper portion or segment 2 of the minor lens being indexed 1.62, the lower portion 3 being indexed 1.69, while the major lens is indexed 1.523. The lenses thus provided may be fused and ground with smooth or unbroken surfaces on both sides, the upper portion 1 providing the usual distance lens, the portion 2 providing an intermediate vision lens which is adapted for use at a distance of two or three feet, while the portion 3 provides a reading or near vision lens for use at approximately fourteen inches.

Figure 5:
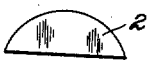
Figure 5 is a view of the upper segmental lens.
Figure 6:
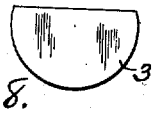
Figure 6 is a view of the lower segmental lens.
Figure 7:
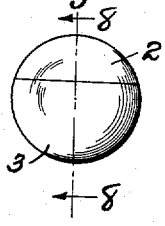
Figure 7 is a view showing the upper and lower segmental lenses arranged to form a minor lens and ready for application to the major lens.
Figure 8:
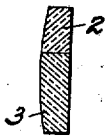
Figure 8 is a sectional view on the line 8—8 of Figure 7.
Figure 9:
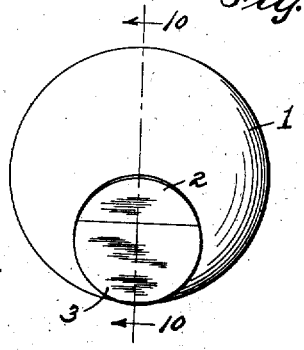
Figure 9 is a view of the major and minor lenses assembled preparatory to grinding.
Figure 4:
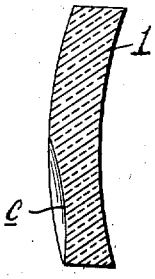
Figure 4 is a section on the line 4—4 of Figure 3.
Figure 10:
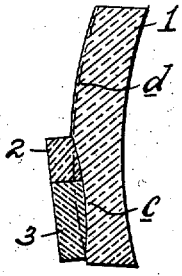
Figure 10 is a section on the line 10—10 of Figure 9.

For the best understanding of the preferred method of formation of the improved trifocal lens, particular attention is directed to the drawing wherein Figure 4 illustrates the major lens 1 provided with a countersink *c*. The segments 2 and 3 which are illustrated respectively in Figures 5 and 6 of the drawing may be fused together and the lens thus formed fused within the countersink *c*, or the segments may be cemented together and the lens fused into position, or the minor lens may be cemented to the major lens. After the parts have been assembled in position, it is only necessary to suitably heat the blank to soften the two parts or segments of the minor lens and permit it to become united with the major lens to form the blank illustrated in Figures 9 and 10 of the drawing. The blank is then ground in the usual manner as indicated by the dotted line *d* in Figure 10, so that the finished lens is formed with a single continuous curve.

As before mentioned the parts may be fused or cemented, or a combination of fusing or cementing may be employed, the gist of the invention residing in the provision of glass with several indices of refraction so designed and placed within the single countersink so as to provide a trifocal lens in which the prismatic displacement across the respective boundary lines between the various portions has been effectively minimized.

By reason of the present invention, a more practical intermediate vision portion and near vision portion results, the near vision segment having its optical center at the geometrical center of the minor lens as an entirety.

The invention is susceptible of various changes in its form, proportions and minor details of construction and the right is herein reserved to make such changes as properly fall within the scope of the appended claims.

Having described the invention what is claimed is:—

1. In a trifocal lens, a major lens and a circular insert set in the major lens and consisting of two segments of which one is less than a full circle with a flat top and has its vertical dimension greater than the radius of the circle but less than the diameter of the circle, the other segment being less than a semi-circle with a flat bottom and having its vertical dimension less than the radius of the circle, the major lens and the two segments each having a different index of refraction from the other two.

2. In a trifocal lens a major lens having a single cavity and a circular insert set therein, said insert consisting of two segments of which one is less than the full circle with its vertical dimension greater than the radius of the circle but less than the diameter of the circle and its top of different outline from the outline of the remainder of the insert and the other is less than a semi-circle with its vertical dimension less than the radius of the circle and its bottom of different outline from the outline of the remainder of the insert, the major lens and the two segments each having a different index of refraction from the other two.

3. In a trifocal lens, a major lens, and a dual minor lens consisting of a circular disk insert set in the major lens below the horizontal diameter thereof and composed of but two segments having different indices of refraction, each of said segments having a different index of refraction from the major lens and the two segments being joined on a line parallel with the horizontal diameter of the major lens and constituting a chord less than the diameter of the minor lens but greater than the radius thereof, the lower segment extending to the bottom of the major lens.

4. In a trifocal lens, a major lens, and a dual minor lens consisting of a circular disk insert set in the major lens below the horizontal diameter thereof and composed of but two segments having different indices of refraction, each of said segments having a different index of refraction from the major lens and the two segments being joined on a line parallel with the horizontal diameter of the major lens and constituting a chord less than the diameter of the minor lens but greater than the radius thereof, the lower segment extending to the bottom of the major lens, the optical center of the lower segment being coincident with the geometrical center of said minor lens.

5. In a trifocal lens, a major lens, and a dual minor lens consisting of a circular disk insert set in the major lens below the horizontal diameter thereof and composed of but two segments having different indices of refraction, each of said segments having a different index of refraction from the major lens and the two segments being joined on a line parallel with the horizontal diameter of the major lens and constituting a chord less than the diameter of the minor lens but greater than the radius thereof, the lower segment extending to the bottom of the major lens, the optical center of the lower segment being coincident with the geometrical center of said minor lens and being positioned at least two and one-half millimeters below the line of juncture of the two segments.

6. In a lens, a major lens of one kind of glass, and a circular insert having segments of two other kinds of glass, said insert being divided above the major diameter thereof, the vertical dimension of one segment being less than the radius and that of the other segment being greater than the radius of the insert.

7. In a trifocal lens, a major lens having a single cavity and an insert having two segments of glass differing from one another and from the major lens inserted therein, said insert consisting of a circular member, the vertical dimension of one segment being greater than the radius of the circle but that of the other segment being less than the radius of the circle, said segments being joined along a line of different outline from the outline of the remainder of the insert.

8. In a lens, a major lens and an insert having two segments of glass differing from one another and from the major lens, said insert consisting of a circular member, the vertical dimension of one segment being greater than the radius of the circle but that of the other segment being less than the radius of the circle.

9. In a trifocal lens, a major lens, and a dual minor lens consisting of a circular disk insert composed of but two segments having different indices of refraction, each of said segments having a different index of refraction from the major lens, said two segments being joined on a line, the length of whose chord is less than the diameter of the minor lens but greater than the radius thereof.

VIRGIL H. HANCOCK.